Sept. 15, 1931.                C. S. CARD                    1,823,561
                    METHOD OF MAKING CONDUCTOR CLAMPS
                    Filed Jan. 23, 1930        3 Sheets-Sheet 1
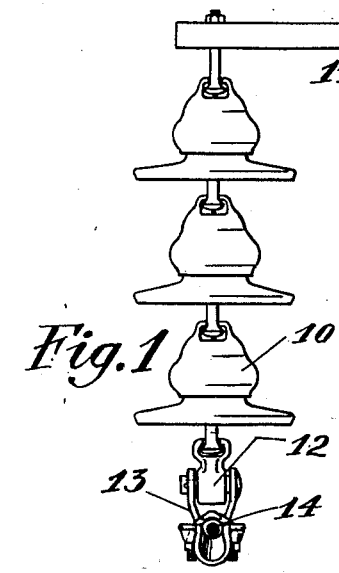
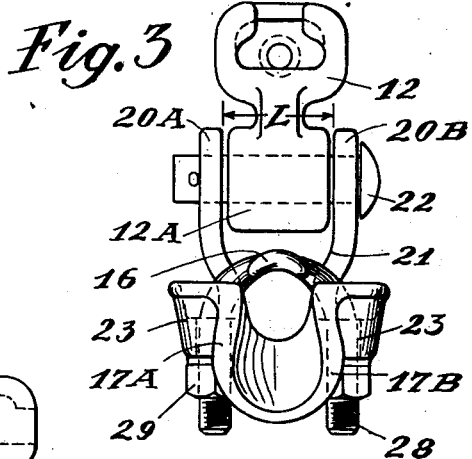
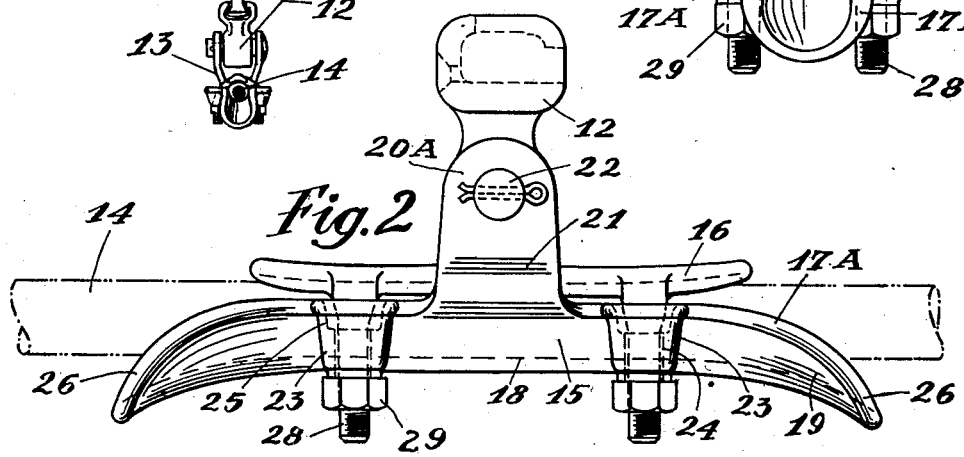
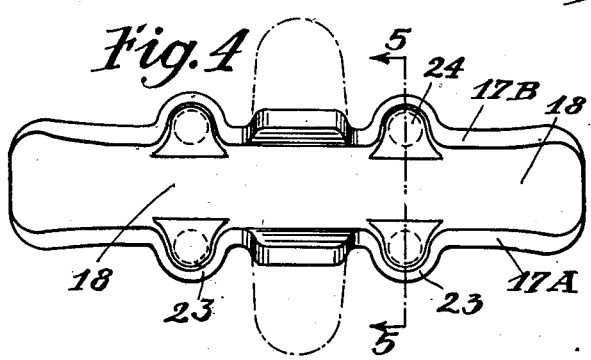
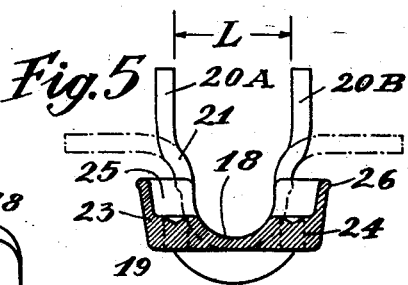
CHARLES S. CARD.
INVENTOR.
BY Louis Illmer
ATTORNEY.

Sept. 15, 1931.  C. S. CARD  1,823,561
METHOD OF MAKING CONDUCTOR CLAMPS
Filed Jan. 23, 1930  3 Sheets-Sheet 2
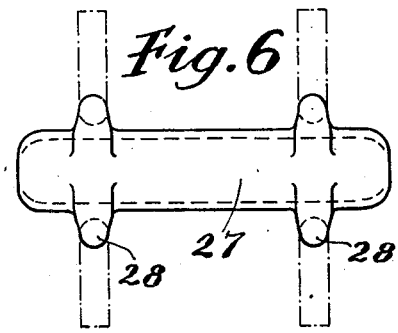
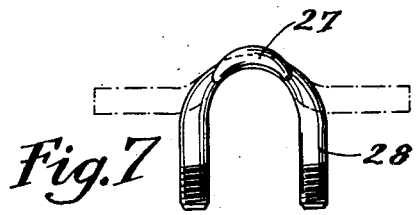
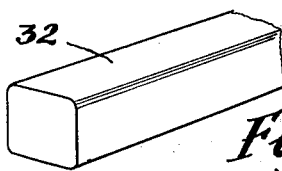
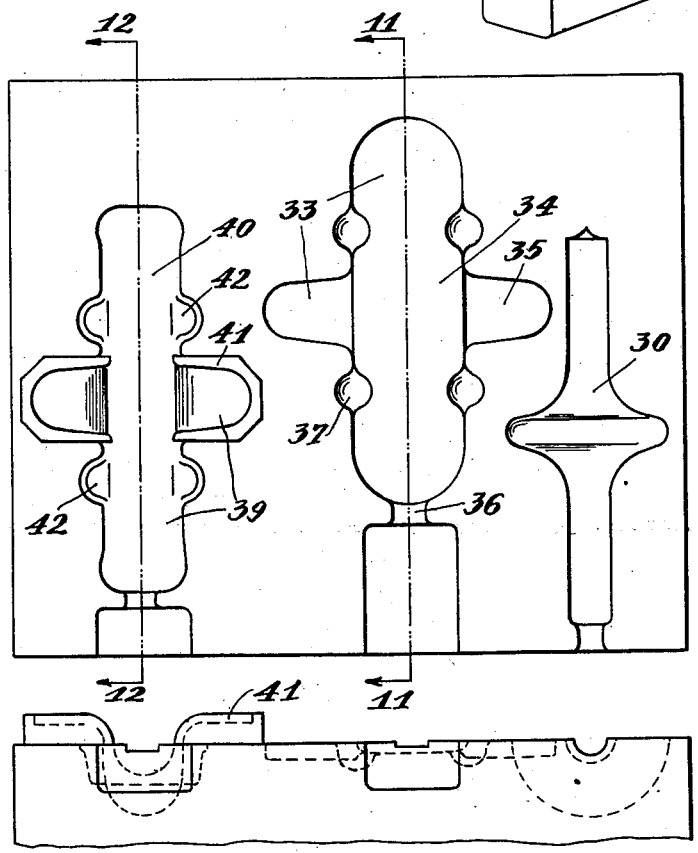
CHARLES S. CARD
INVENTOR.
BY Louis Illmer
ATTORNEY.

Sept. 15, 1931.  C. S. CARD  1,823,561
METHOD OF MAKING CONDUCTOR CLAMPS
Filed Jan. 23, 1930  3 Sheets-Sheet 3

CHARLES S. CARD,
INVENTOR.
BY Louis Illmer
ATTORNEY.

Patented Sept. 15, 1931

1,823,561

UNITED STATES PATENT OFFICE

CHARLES S. CARD, OF CORTLAND, NEW YORK, ASSIGNOR TO THE BREWER-TITCHENER CORPORATION, OF CORTLAND, NEW YORK, A CORPORATION OF NEW YORK

METHOD OF MAKING CONDUCTOR CLAMPS

Application filed January 23, 1930. Serial No. 422,923.

My invention relates to the art of forging cable clamps or the like, and more particularly pertains to an improved method for hot forging and otherwise forming up complementary metal clamping members essentially comprising a grooved body member and a cooperating retainer that may be kept relatively light in weight and especially adapted to secure high-tension conductors to insulators of the suspension type or other mode of support. Such clamps are required to possess the utmost reliability as to structural material for the reason that it is both arduous and expensive to replace any defective clamp, once it has been placed in service. In addition, clamps of the type herein contemplated are likely to be subjected to severe loading in case the suspended conductor should become ruptured due to heavy icing or like contingencies.

The primary object of my improvements is to effectively and economically complete a clamp product of the character indicated by a series of relevant forging processes as distinguished from making the same article by a casting process and in which the clamp body is provided with one or more integrally formed suspension elements.

While the cast type of clamp may readily be given complicated body or keeper shape, it often becomes virtually impossible to duplicate a like shape in the forged style of clamp. There is herein depicted a clamp design that is especially suited to forging methods and one that can readily be handled at a low production cost, partly because of the elimination of abnormal die wear. This end may be facilitated by first forming up billet stock into a roller-like planchet which is in turn flattened out into a suitable blank or impression having different wall forming thicknesses that respectively respond to those desired in the ultimate product, and which blank through the instrumentality of die means, is thereupon further finished up and also given the desired clamping member shape.

The present invention seeks to promote quality and uniformity of product by means of improved method steps and other distinctive features of manipulation, which will hereinafter be more fully described. Reference is had to the accompanying three sheets of drawings which are illustrative of a specific embodiment of my invention together with dies that may be used in forging such an insulator clamp, in which drawings like characters of reference indicate like parts, and in which:

Fig. 1 represents an assembly of a string of interconnected insulator discs arranged in conventional fashion to suspend a high-tension line and equipt with my conductor clamp.

Fig. 2 shows an enlarged side elevational view of said clamp as assembled with a keeper and adapter-link, while Fig. 3 is an end view thereof.

Figs. 4 and 5 detail in plan and in end elevational views respectively, the grooved body member of said clamp.

Figs. 6 and 7 illustrate structural details of the retainer member of my clamp.

Fig. 8 shows the style of square billet or bar stock out of which said clamp body may be forged.

Figure 12:
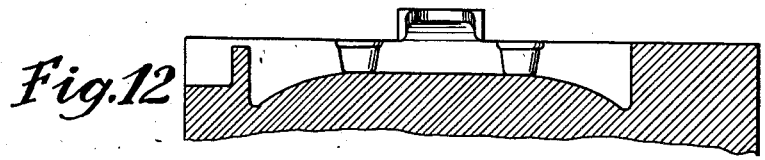
Figure 11:
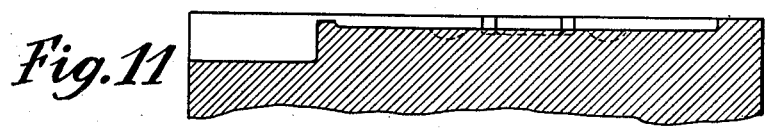

Figs. 9 and 10 respectively represent plan and end views of a recessed blocking die sunk to successively shape up the grooved body member of my clamp provided with overhanging suspension straps that are initially disposed in diverging directions, while Figs. 11 and 12 indicate different transverse sections of said die block as respectively taken along the lines 11—11 and 12—12 of Fig. 9.

Figure 13:
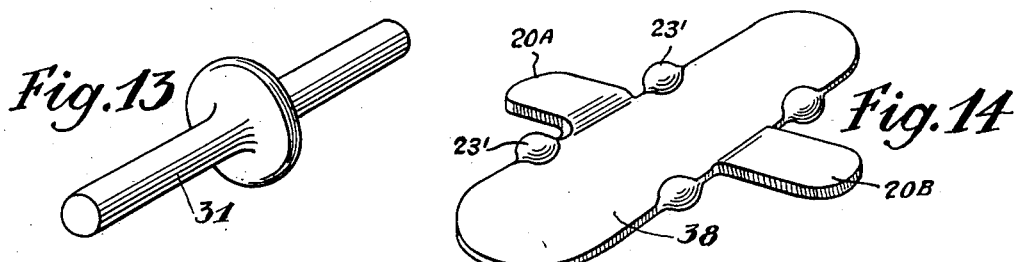
Figure 14:
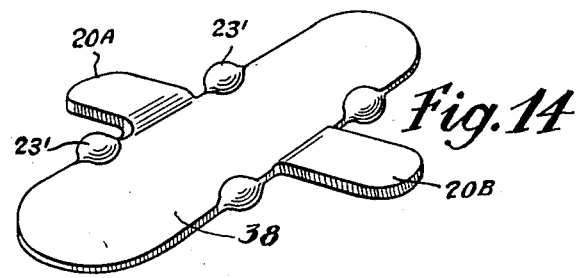

Fig. 13 is a perspective view of the roller like planchet that may be forged from said billet and Fig. 14 is a similar view showing the clamp body blank that may be formed therefrom.

Figure 16:
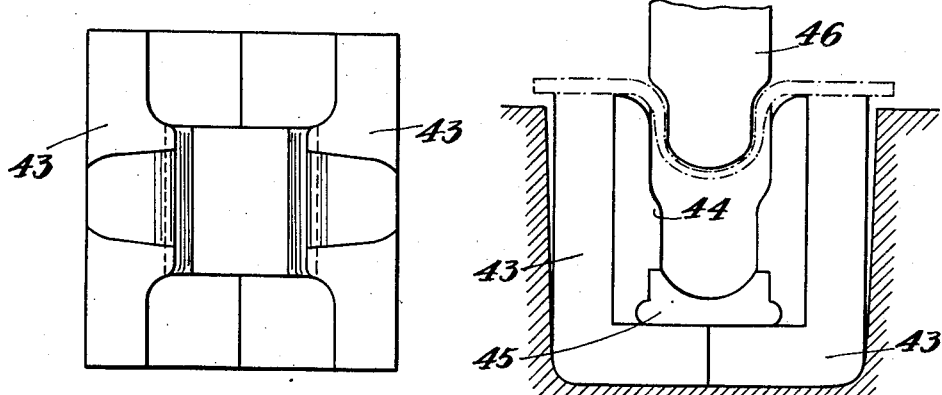
Figure 15:
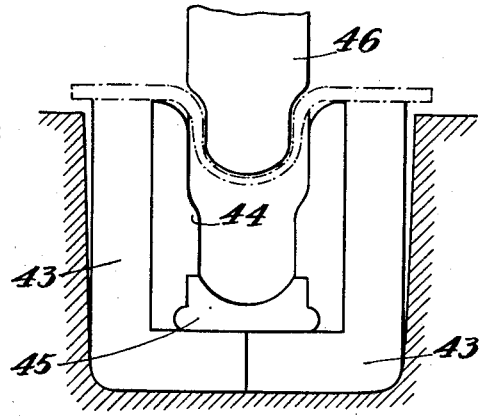

Figs. 15 and 16 respectively show end and top views of a bending die adapted to upturn the free strap ends into parallelism after said body member has otherwise been finished in the die block.

Figure 17:
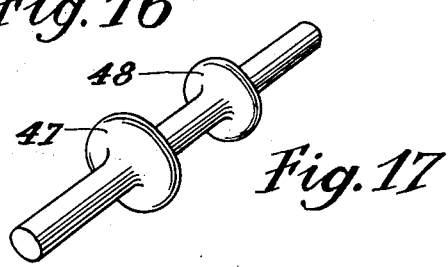

Fig. 17 shows a modified roller type of planchet from which a keeper blank may be formed.

Referring first to Fig. 1, this schematically represents a chain of conventional insulator discs such as 10 of which the uppermost one is in the present instance shown as suspended in a suitable manner from a supporting cross arm 11 or the like as commonly carried from a high-tension transmission pole or tower. The lowermost of said discs is usually equipped with an adapter link 12 that may be pivotally connected to my assembled clamping devices which are as a whole designated as 13 and serve to grip the conductor 14.

Fig. 2 shows in enlarged scale, the principal structural feature of one such clamp assembly that preferably comprises a channel-shaped body member 15 and cooperating retainer-member 16 adapted to tightly clamp the conductor therebetween in the usual manner. The particular style of grooved body herein disclosed, embraces a pair of spaced upturned side walls 17A and 17B which are interconnected by a bottom wall or seat element 18. The respective terminal portions of said grooved seat are preferably turned outwardly and away from the conductor axis into a flared lip such as 19. The center region of said upstanding side-walls respectively carry integral suspension straps 20A and 20B which toward their outermost ends, may be laterally offset at 21 in order to afford an augmented gap "L" therebetween adapted to pivotally receive a relatively long adapter-link boss 12A in the fashion indicated in Fig. 3. The free terminal strap portions are apertured in the usual fashion to receive the transverse support pin 22. The purpose in thus spreading apart the strap ends is to provide for a standardized link gap "L" irrespective of the bore size that may be given the body groove, although when desired, said straps may also be kept straight and devoid of any such offset.

Carried exteriorly of the respective side walls 17A and 17B and spaced lengthwise of the body groove, are shown pairs of outwardly disposed bosses such as 23, each provided with holes 24 running transversely of the groove axis. If desired, each such uppermost hole portion may be given an enlarged depression such as 25 which may be extended inwardly and made to merge with the groove contour. It is further preferred to provide the body edge portion with a reenforcing bead 26 which may extend around the uppermost boss faces and also serves to trim the respective groove lips in the manner indicated.

Turning to the structural features embodied in my conductor retaining member 16, this may comprise a keeper bar 27 (see Figs. 6 and 7) provided with pairs of integrally formed down-turned extensions or bolt shanks such as 28 of which the respective ends are threaded and each provided with a nut 29. Said depending shanks are suitably spaced to freely enter the respective boss holes 24 and have the nuts applied thereto from below. The longitudinally disposed keeper bar may also be shaped into a dished profile so as to snugly fit a round conductor contour while the outermost ends of said bar are preferably directed upwardly and away from the conductor axis. It will be observed that the interconnecting crown portion of the respective bolt pairs is given a substantially semi-circular formation with their depending shanks disposed in parallel relation. The width of the keeper-bar 27 is preferably kept such that it may freely be entered into the mouth of upturned body groove while each angularly shaped shank 28 is made to overhangingly reach out beyond its adjacent groove side wall.

Attention is now directed to my improved forging process for making the complementary stamping members heretofore described. Figs. 4 and 5 disclose the step-wise formation of the body member 15 in further detail. In order to obviate having to extrude or otherwise drive the forged metal into any die recesses requiring a depth equal to the full length of my suspension straps, it is preferred to first shape up the strap portions 20A and 20B in aligned but opposed directions respectively extending from the complementary side-walls as indicated in dotted outline. The die part-line may then be carried along the center region of said straps and made to follow the groove contour. Figs. 9 and 12 inclusive illustrate a bottom die block of this kind and as will be understood, the mated matrix or top die block (not shown) is intended to be sunk in a complementary or counter-part fashion.

My illustrative die block is shown equipt with three different compartments of which the first may comprise a roller-like planchet forming chamber 30. The medial region thereof provides for semi-disc-like recess having rounded stem depressions disposed to either side thereof adapted to impress up a planchet 31 (see Fig. 13), which may be formed from the square metal bar stock 32 of Fig. 8. The cited operation preferably but not necessarily constitutes the initial step of my method.

As a further step, said planchet may be subjected to the action of the blanking die compartment designated as 33 and which comprises a relatively shallow centrally disposed flat recess 34 having rounded ends. Extending outwardly from this central region, are sunk two oppositely disposed wing die portions such as 35, of which the bottom wall is preferably kept at a somewhat lower level than that of the recess 34 and thus provide for an augmented strap thickness as compared to that given to the body groove heft. One of the rounded ends of the die recess 34 may be hollowed out to allow for a forging sprue 36 and alongside the recess 34, there is further provided a plurality of spaced spherical depressions such as 37 which are intended to gather metal into the nub-like protuberances 23' (see Fig. 14) for the subsequent formation of the body bosses 23. After the planchet 31 is passed through the die compartment 33, it will be flattened out and shaped up into the pancake-like blank 38 shown in Fig. 14, where both wall forming thicknesses are already preferably brought to the final heft or thickness that may be desired for the finished product.

As a third step, said blank is transferred into the finishing die compartment 39 comprising a longitudinally grooved chamber 40. Said bottom block may also be equipped with complementary raised die portions such as 41 that lie above the normal part-line level and are oppositely chambered to receive the wing-like projections of the blank 38 thereacross. Said die is further provided with boss forming sockets such as 42 which serve to shape up the described sphere-like blank protrusions into body bosses designated as 23. As will be understood, the entire forging operation is preferably conducted in a single heat; when the top or male die is brought down upon the described bottom die while the blank is interposed therebetween, said body blank will be bent up into channel shape having its respective ends formed up into the flared lips 19 (see Fig. 2) while the laterally overhanging straps will at the same time be thrown into the diverging positions indicated by dotted outline in Figs. 4 and 5. Such initial shaping up of the straps, allows of using shallow die recesses and prevents the hot forgings from sticking therein.

The flash or forging fin may now be trimmed off and as a last step in fabricating the body member of my clamp, it now remains to turn up the free end portions of said diverging strap forming elements 20A and 20B into the desired final parallel relation. This may readily be accomplished by the use of a bending die of the type disclosed in Figs. 15 and 16 or by any other suitable means. As shown, the bottom die may comprise a pair of split jaws such as 43 which are interiorly equipped with spaced vertical abutments that are each offset at 44 to admit of imparting a corresponding shape to the clamp straps. A rounded thrust block 45 may be disposed across the bottom of said jaws while the uppermost faces thereof are respectively sunk to receivingly hang and center said extended body strap portions in the manner indicated in dotted outline. The punch 46 of my bending die is then brought down upon the center region of the aforesaid grooved body member which in turn simultaneously bends up said straps in the offset relation shown in full outline by Fig. 5. This final step completes the forging operation required to fabricate a clamp body having the relatively intricate structural characteristics that were previously described. The body member is now made ready to have the boss holes 24 and the strappin apertures drilled therethrough. It will be obvious that the die recesses are intended to provide for the necessary forging draft heading toward the part line. If desired, all of the described boss depressions such as 25 may readily be formed during the body forging process.

As a distinguishing feature of my method, it is emphasized that the finishing die or third step is largely confined to a shaping up of the clamp body groove while the primary or heavy-duty forging occurs during the first and second steps, that is to say prior to forming the forging into any complicated shape and all of which not only expedites the work in hand, but serves to greatly preserve the expensive dies against excessive wear or abnormal breakage loss.

My finishing die compartment is purposely designed to introduce the cited intermediary reforming step since it is preferred to work with a blank such as Fig. 14 having aligned but divergently disposed wing-like extensions that are offset relative to the elongated groove-forming plate region of said blank, and it will be observed that the thickness of such center region is kept comparatively thin to facilitate its subsequent bending into a trough shape while the cross-section of the apertured suspension straps is given a relatively greater thickness in order to assure ample pull strength that will be commensurate with the supporting pivot 22. It is further emphasized that the elongated flat central region of my blank is swaged throughout its length into a grooved body shape having a flared lip at each end thereof and that the respective protuberances 23' are at the same time reshaped to constitute bosses such as 23.

A further advantage inherent in my method, resides in being able to closely hold the shaped-up body groove of all my clamps to a fixed size and contour since this is an important requirement now being demanded by the trade. If an attempt were made to completely shape up and finish the body forging in a single impression, the dies would suffer from excessive wear and the forging tend to stick in the dies; furthermore, stock is likely to spread out excessively between the dies rather than fill up the required deep die crevices, this being particularly true in the case of high carbon steel from which high-tension clamps are preferably forged.

Referring now to the manner in which my one-piece keeper may be forged up with integral prongs, this may be kept substantially identical in method, except that I prefer when providing for duplicated prongs, to fashion the planchet into a pair of interconnected roller-like discs 47 and 48 as shown in Fig. 17. As will be understood, these discs are intended to be flattened out to constitute a blank that is ultimately shaped up into outwardly projecting bolt shanks such as are indicated by dotted outline in Figs. 6 and 7. By the use of a bending die substantially similar to that described in connection with Figs. 15 and 16, these shanks 28 are then down-turned into the full-lined parallel relation shown in Fig. 7 but the heavy-duty operations are again all performed prior to shifting the keeper forging into the finishing die. It is not essential however that my keeper bar be equipt with four depending bolt shanks; for some purposes, one such shank disposed adjacent to the respective keeper ends would provide for ample clamping power but any die changes required to meet this alternative structure are thought to be apparent.

It will be obvious that as applied to certain kinds of work, the described planchet forming step may be uncalled for and the blank 38 forged directly from a billet or other suitable stock. Likewise it is not essential that complementary supporting straps be resorted to for supporting my trough-shaped body member since the described process is also applicable to clamps of the side opening type where but a single strap is needed. It will be understood that various other changes in the structural details or mode of manipulation may be resorted to in carrying out the described method of making suspension clamps or the like, and that while it is generally preferred to adhere to the operative steps as described, the same results might also be obtained when the order thereof is partially reversed or otherwise modified, all without departing from the spirit and scope of my invention heretofore described and more particularly pointed out in the appended claims.

Claims:

1. The method of forging a one-piece suspension clamp member or the like, which method includes the step of swaging bar-stock into a flattened blank provided with an elongated plate-like part having a suspension forming element extending laterally from a longitudinal edge thereof, and the step of swaging the center region of said plate-like part throughout its length into a cross-sectionally trough shape and simultaneously striking a flared lip at each trough end to form a seated conductor groove having an integral suspension element overhanging one of the groove side-walls between the aforesaid lips.

2. The method of forging a one-piece suspendable grooved clamp member or the like, which method includes the step of swaging bar-stock into a flattened blank provided with an elongated relatively thin plate-like part having a pair of wing-like suspension forming elements whose thickness is greater than that of the plate-like part and respectively extend from opposite longitudinal plate edges, and the step of swaging the center region of the aforesaid plate-like part into a cross-sectionally groove-shape having lip means at each groove end that flare outwardly away from the longitudinal axis of the groove, and thereupon bringing the free extremities of the respective suspension forming elements toward each other.

3. The method of forming a grooved clamping member which method includes the step of swaging stock into a flattened blank having an elongated plate-like part provided with boss-forming protuberances, and thereupon reshaping of said protuberances into bosses while simultaneously swaging said plate-like part throughout its length into a cross-sectionally groove-shape having a struck-up flared lip at each end thereof.

4. The method for forging from stock, a one-piece suspendable grooved conductor clamp member or the like, which method includes the step of swaging said stock into a flattened blank having an elongated plate-like part provided with boss-forming protuberances and further having a pair of suspension forming elements respectively extending from opposite longitudinal edges of the plate-like part, and thereupon forming said plate-like part into a grooved-shape throughout its length simultaneously with the re-shaping of said protuberances into bosses.

5. The method of forging bar-stock into a one-piece grooved body clamping member or the like by the use of mated die-block means providing separate compartments respectively comprising a planchet forming chamber, a blanking chamber, and a finishing chamber, and which method consists in the following steps: firstly, by means of the first named die compartment forming up a roller-like planchet; secondly, subjecting said planchet to the action of the blanking die compartment to form a blank having an elongated flattened central region provided with raised nub-like protrusions thereon and also providing on said blank a pair of offset strap-forming elements respectively extending from opposite longitudinal edges of said central region; thirdly, transferring said blank into the finishing chamber and forming the central region of the blank into a cross-sectionally grooved shape and deforming said protrusions into bosses; and fourthly, turning the extremities of the strap-forming elements toward each other.

6. The method of forging a grooved clamping body of the suspension type, which method includes the step of swaging bar-stock into an elongated flattened blank from each of whose opposite longitudinal edges there extends a strap-forming element; forming said blank into a cross-sectionally grooved shape from whose side walls the respective strap extensions point in diverging directions; and, finally, bending the extremities of said straps toward each other in offset spaced relation to provide for an augmented gap between said extremities.

7. The method of forging a retaining member for a conductor clamp which is provided with a pair of apertured boss means oppositely disposed with respect to the body sides of the clamp, said method including the swaging of a planchet; then flattening out said planchet into a blank having an elongated dished central region from the opposite longitudinal edges of which there extend overhanging shank-forming elements; and thereupon reforming the free ends of the respective shank-forming elements for adaptability to register with the bosses of the body member with which said retaining member is intended to cooperate.

In testimony whereof, I have herewith set my hand this 21 day of January, 1930.

CHARLES S. CARD.